(12) United States Patent
Sauvinet

(10) Patent No.: US 8,738,199 B2
(45) Date of Patent: May 27, 2014

(54) METHOD FOR DRAMATICALLY REDUCING THE TAKE-OFF RUN OF AN AIRCRAFT

(75) Inventor: Frédéric Sauvinet, Tournefeuille (FR)

(73) Assignee: Airbus Operations (SAS), Toulouse Cedex (FR)

( * ) Notice: Subject to any disclaimer, the term of this patent is extended or adjusted under 35 U.S.C. 154(b) by 773 days.

(21) Appl. No.: 12/935,411

(22) PCT Filed: Mar. 30, 2009

(86) PCT No.: PCT/FR2009/000359
§ 371 (c)(1),
(2), (4) Date: Sep. 29, 2010

(87) PCT Pub. No.: WO2009/133268
PCT Pub. Date: Nov. 5, 2009

(65) Prior Publication Data
US 2011/0054719 A1  Mar. 3, 2011

(30) Foreign Application Priority Data
Apr. 2, 2008 (FR) ..................... 08 01820

(51) Int. Cl.
*G05D 1/00* (2006.01)
*G05D 1/08* (2006.01)
*G05D 3/00* (2006.01)
*G06F 7/00* (2006.01)
*G06F 17/00* (2006.01)

(52) U.S. Cl.
USPC ............................................................ 701/4

(58) Field of Classification Search
USPC ............................................................ 701/4
See application file for complete search history.

(56) References Cited

U.S. PATENT DOCUMENTS

| 4,717,097 A | 1/1988 | Sepstrup |
| 5,702,072 A | 12/1997 | Nusbaum |
| 2009/0230253 A1* | 9/2009 | Delaplace et al. .......... 244/90 R |

OTHER PUBLICATIONS

Written Opinion of the International Searching Authority, for International Application No. PCT/FR2009/000359.
"Takeoff", See How It Flies (Jul. 28, 2007). http://web.archive.org/web/20070728135952/http://www.av8n.com/how/htm/takeoff.htm: pp. 1-19.

* cited by examiner

*Primary Examiner* — Maceeh Anwari
(74) *Attorney, Agent, or Firm* — Novak Druce Connolly Bove + Quigg LLP

(57) ABSTRACT

According to the invention, during take-off, the aircraft (AC) is given an attitude ($\theta_c$) close to the tail-touching attitude and the ailerons (6G, 6D) are fully deflected downwards.

8 Claims, 3 Drawing Sheets

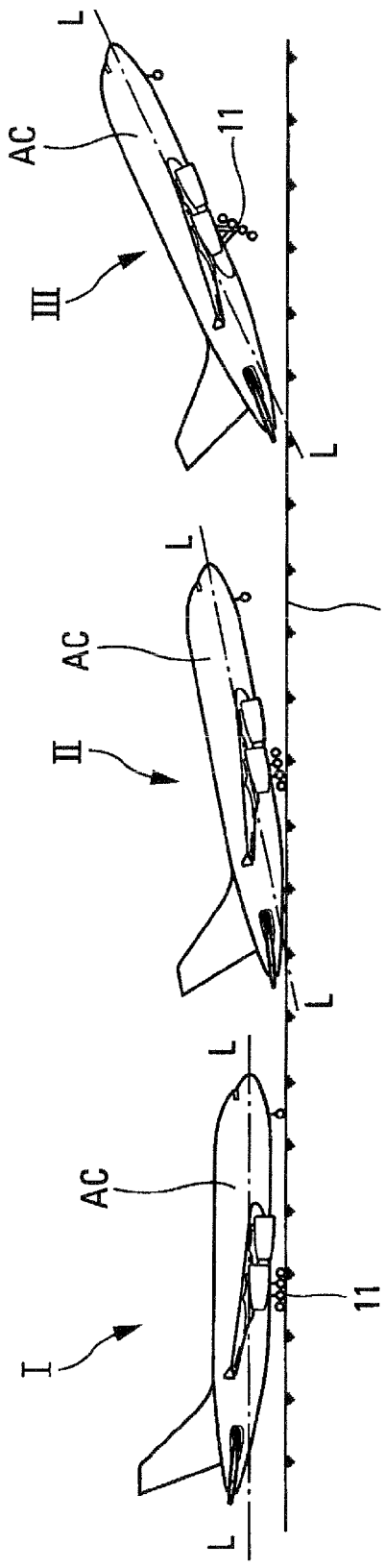
Fig. 3
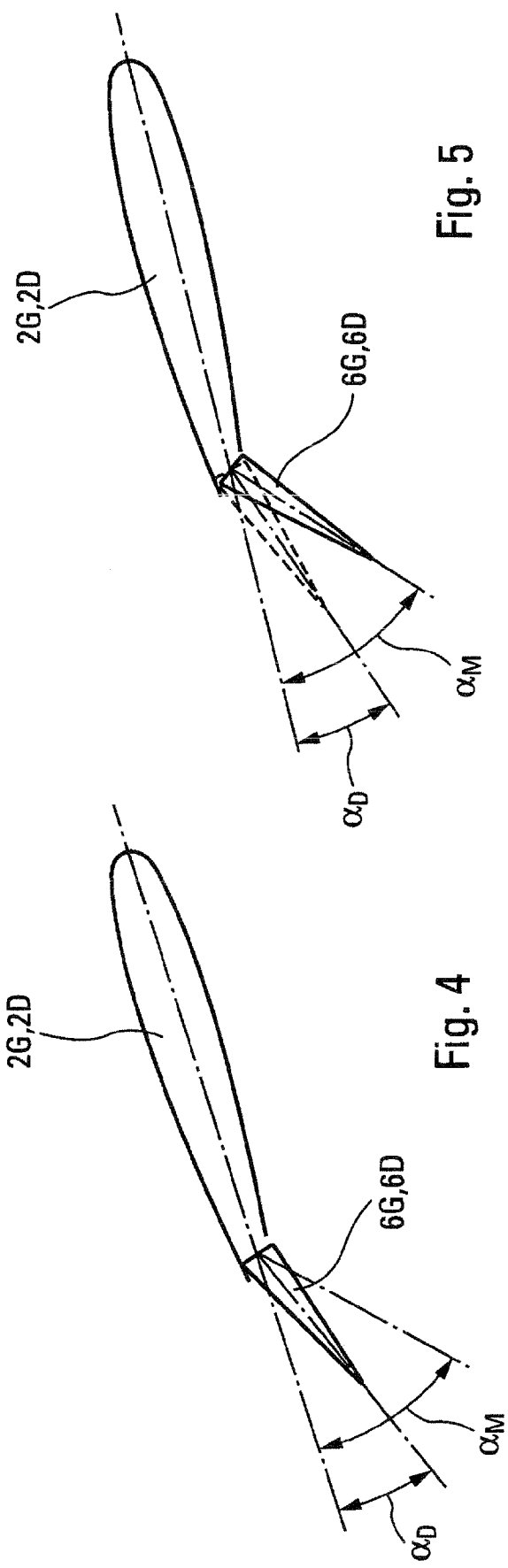
Fig. 4
Fig. 5

METHOD FOR DRAMATICALLY REDUCING THE TAKE-OFF RUN OF AN AIRCRAFT

CROSS-REFERENCE TO RELATED APPLICATIONS

This application is a §371 national stage entry of International Application No. PCT/FR2009/000359, filed Mar. 30, 2009, which claims priority to French Patent Application 08/01820, filed Apr. 2, 2008, the entire contents of which are incorporated herein by reference.

FIELD OF THE INVENTION

The present invention relates to a method for exceptionally reducing the take-off run of an aircraft.

BACKGROUND OF THE INVENTION

It is known that the take-off run of an aircraft is defined by parameters such as performance and mass of said aircraft, condition of tires thereof and of take-off runway, etc.

Therefore, a determined take-off run value corresponds to a set of values of these parameters.

However, this determined take-off run value may not be met, for example because the take-off runway is too short, the mass of the aircraft is too high, etc., which would prohibit said aircraft from taking-off.

SUMMARY OF THE INVENTION

The object of the present invention is to overcome these drawbacks.

For that purpose, according to the invention, the method for exceptionally reducing the take-off run of an aircraft provided with at least one piloting stick, a main landing gear, ailerons and depth moving aerodynamic surfaces, take-off run during which said aircraft is running upon a take-off runway by accelerating with said main landing gear compressed by the mass of said aircraft and by the ground effect and with said ailerons occupying a position partly deflected downwards to make the fineness ratio of said aircraft maximum,
is remarkable in that:
  by tilting said piloting stick in the nose-up direction, said depth aerodynamic surfaces are deflected upwards to provide said aircraft with a high value attitude close to, but lower than, the attitude for which the tail of said aircraft would strike said take-off runway;
  after said deflection upwards of the depth aerodynamic surfaces able to provide said aircraft with said high value attitude and while said main landing gear is still compressed, said ailerons are fully deflected downwards, symmetrically, from their position partly deflected downwards; and
  in this high value attitude position with said ailerons fully deflected downwards, the acceleration of said aircraft is continued until take-off thereof.

Thus, thanks to the present invention, due to this full deflection downwards of said ailerons, the aircraft lift is temporarily increased, which then is at an attitude close to the tail strike attitude thereof, which results in reducing the take-off run of the aircraft.

The depth aerodynamic surfaces used in this method can be the horizontal rudders and/or and incidence adjustable horizontal stabiliser, generally referred to either as the abbreviation PHR (for Plan Horizontal Reglable in French) or THS (for Trimmable Horizontal Stabiliser).

Preferably, said full symmetrical deflection downwards of said ailerons is only allowed above a tilting threshold of said piloting stick in the nose-up direction, said tilting threshold being at least equal to the take-off tilting usually used upon a regular take-off.

Further, advantageously, said full symmetrical deflection downwards of said ailerons is only allowed above a nose-up attitude threshold, which is at least equal to the maximum attitude value imposed on said aircraft so that a tail strike during a regular take-off rotation is avoided.

In order to avoid reducing the acceleration performance of the aircraft at the beginning of a take-off, the full deflection downwards of said ailerons should not occur before the aircraft attitude is close to the tail strike attitude. Moreover, to avoid reducing the ascent performance of the aircraft after take-off thereof, it is advantageous that, after ballasting-up of said main landing gear, said ailerons are brought back from the full deflected position downwards to said partly deflected position downwards.

On the other hand, it is known that the flight control calculators of the aircraft have information about the piloting stick tilting and the aircraft attitude. Therefore, it is interesting to implement the method according to the invention in said calculators. For that purpose, the following can be carried out:
  a stick criterion is set, the value of which is 0 below said tilting threshold and the value of which increases from 0 to 1 between said tilting threshold and a controlled tilting value close to, but lower than, the maximum nose-up tilting of said stick;
  an attitude criterion is set, the value of which is 0 below said attitude threshold and the value of which increases from 0 to 1 between said attitude threshold and a controlled attitude value close to, but lower than, said tail strike attitude; and
  from the greater of these two criteria, an aileron deflection criterion is set that steadily increases from the value corresponding to the partly deflected position downwards to the value corresponding to the fully deflected position downwards, when said greater criterion switches from the value of 0 to the value of 1.

Since, in addition, said flight control calculators are provided with information about whether the aircraft is on the ground or not, the following can be advantageously carried out:
  a ground criterion is set, which assumes the value of 0 when the aircraft is flying and the value of 1 when the aircraft is on the ground; and
  said greater of two criteria that are the stick criterion and the attitude criterion is multiplied by said ground criterion, before setting said aileron deflection criterion.

Thanks to the preceding elements, the method in accordance with the present invention can thus be readily implemented in said aircraft. Therefore, the invention further relates to an aircraft implementing said method of the invention.

BRIEF DESCRIPTION OF THE DRAWINGS

The figures of the appended drawing will give a better understanding of how the invention can be carried out. On these figures, identical references designate similar elements.

FIG. 3 illustrates, in three consecutive phases I, III and III, the method according to the invention, the phase represented on FIG. 2 corresponding to phase II of FIG. 3, and phases I and II being the take-off run of said jumbo jet.

FIG. 4 schematically illustrates the position of the ailerons of said jumbo jet during phases I and III of FIG. 3.

FIG. 5 schematically illustrates the position of the ailerons of said jumbo jet during phase II of FIG. 3.

DETAILED DESCRIPTION

Figure 1:
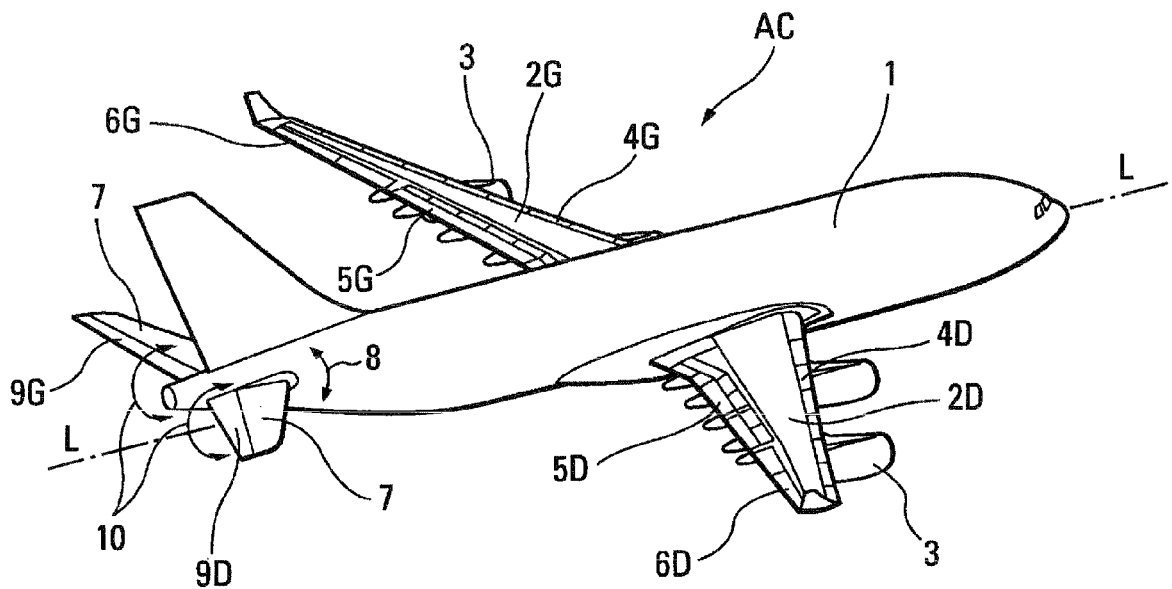
FIG. 1 schematically shows a top and rear perspective view of a jumbo jet that can implement the present invention.
Figure 2:
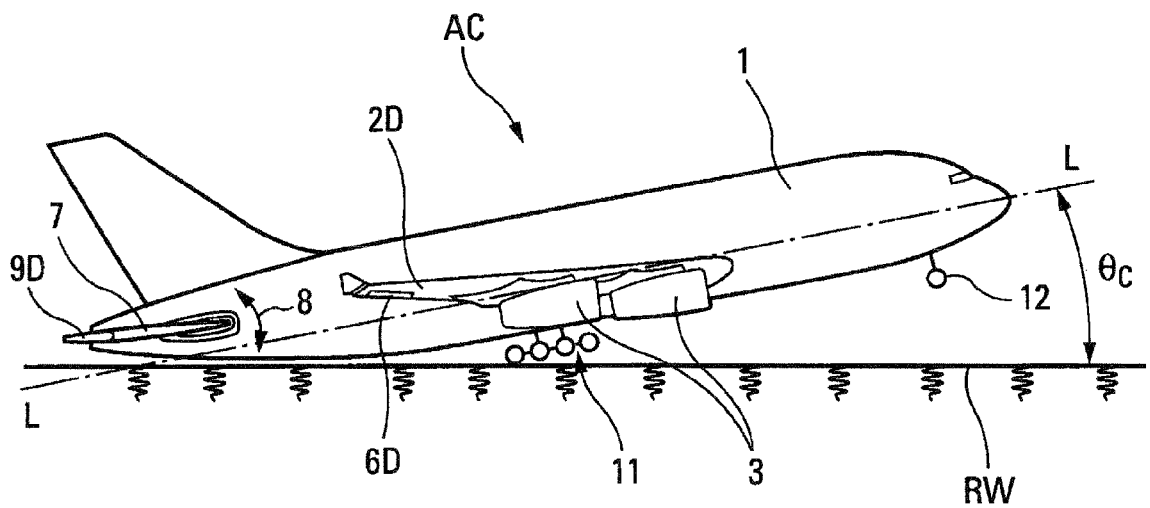
FIG. 2 illustrates a schematic lateral view of the jumbo jet of FIG. 1 during a phase of the method in accordance with the present invention.

On FIGS. 1, 2 and 3, the flaps, slats, horizontal rudders, ailerons, adjustable horizontal stabiliser, as well as the other moving aerodynamic surfaces of the jumbo jet, are shown in the stowed position for clarity of the drawings. It will be readily understood that during phases I, II and III of FIG. 3, at least some of such surfaces are on the contrary in the extended position, though shown in the stow position.

The jumbo jet AC, schematically shown by FIGS. 1 and 2, has a longitudinal axis L-L and includes a fuselage 1 and two symmetrical wings 2G and 2D. Said wings carry engines 3 and a plurality of leading edge slats 4G, 4D and trailing edge flaps 5G, 5D. Moreover, at the end of the wings 2G, 2D, ailerons 6G and 6D are respectively provided. As schematically shown by FIGS. 4 and 5, said ailerons 6G and 6D are rotatably hinged in the rear portion of said wings 2G and 2D, respectively, with their rotation stroke $\alpha$ downwards being able to assume the maximum value $\alpha_M$, counted from their position for which they are in the extension of the corresponding wing 2G or 2D.

In the rear portion of the fuselage 1, the aircraft AC comprises an incidence adjustable horizontal stabiliser 7, as illustrated by the double arrows 8. On the rear edge of said adjustable horizontal stabiliser 7, horizontal rudders 9G, 9D are respectively provided, that can rotate with respect to said stabiliser 7, as illustrated by the double arrows 10.

The aircraft AC further comprises a main landing gear 11, as well as a front landing gear 12.

In FIG. 3, three steps I, II and III of the method in accordance with the present invention are illustrated.

In phase I, the aircraft AC runs along the take-off runway RW by accelerating for taking-off. During this acceleration phase I, the leading edge slats 4G, 4D and the trailing edge flaps 5G, 5D are extended in a conventional way (not shown), the adjustable horizontal stabiliser 7 is tilted to be deflected and the horizontal rudders 9G, 9D are, for example, in their position aerodynamically extending said adjustable horizontal stabiliser 7. In this usual configuration, the assembly of said adjustable horizontal stabiliser 7 and the horizontal rudders 9G, 9D generates a nose-up aerodynamic leading to a nose-up pitching moment for the aircraft AC, the configurations of the leading edge slats 4G, 4D and the trailing edge flaps 5G, 5D allowing the fineness ratio (lift/drag ratio) of the aircraft AC to be optimised. Besides, in this acceleration phase I, the ailerons 6G, 6D are also used to optimise such fineness ratio and they are symmetrically deflected downwards, as illustrated by FIG. 4. To that end, they assume a partly deflected position downwards, defined by a value $\alpha_D$ of the stroke $\alpha$, lower than the maximum stroke $\alpha_M$. It will be readily understood that if said ailerons 6G, 6D were deflected at the maximum value $\alpha_M$, they would generate a high drag, at the expense of the aircraft AC performance during phase I. Of course, in this acceleration phase I, the main gear 11 of aircraft AC is compressed by the mass thereof and by ground effect.

In phase II of the method in accordance with the present invention (see also FIG. 2), the pilot of the aircraft AC actuates the horizontal rudders 9G, 9D and/or the adjustable horizontal stabiliser 7 (not shown) so that the assembly of these horizontal rudders 9G, 9D and this stabiliser 7 generates a nose-up force and a nose-up pitching moment, able to provide the aircraft AC with a controlled attitude $\theta_c$ with a high value close to the tail strike attitude (referred to as $\theta_{TS}$ in FIG. 8) for which the tail of aircraft AC would strike the take-off runway RW, the controlled attitude $\theta_c$ being lower that the tail strike attitude $\theta_{TS}$. In this phase II, in order to supplement the lift of aircraft AC and as shown in FIG. 5, the ailerons 6G, 6D are fully deflected downwards, symmetrically, from their partly deflected position downwards defined above by the value $\alpha_D$ of the rotation stroke $\alpha$. The ailerons 6G, 6D thus assume the maximum deflection position downwards defined by the value $\alpha_M$ of the stroke $\alpha$.

In the position of phase II, the aircraft AC continues its acceleration stroke until take-off thereof and full ballasting-up of the main gear 11, as shown through phase III of FIG. 3.

It will be readily understood that the lift supplemented by the ailerons 6G, 6D in phase II by maximum deflection $\alpha_M$ thereof downwards (FIG. 5) makes it easier for the aircraft AC to take-off and reduces the take-off run of aircraft AC with respect to the situation in which the aircraft AC attitude would be that of phase I with said ailerons 6G, 6D in their partly deflected position downwards of FIG. 4.

It will be further noticed that, to facilitate the ascent performance of aircraft AC after take-off phase III, it is required to bring back the ailerons 6G, 6D from their maximum deflected position downwards, defined by the value $\alpha_M$, to their partly deflected position downwards, defined by the value $\alpha_D$ and corresponding to the optimum fineness ratio.

Consequently, from the above, it can be seen that the full deflection downwards of the ailerons 6G, 6D should only occur during phase II, that is when aircraft AC is on the ground and has a strong attitude.

Figure 6:
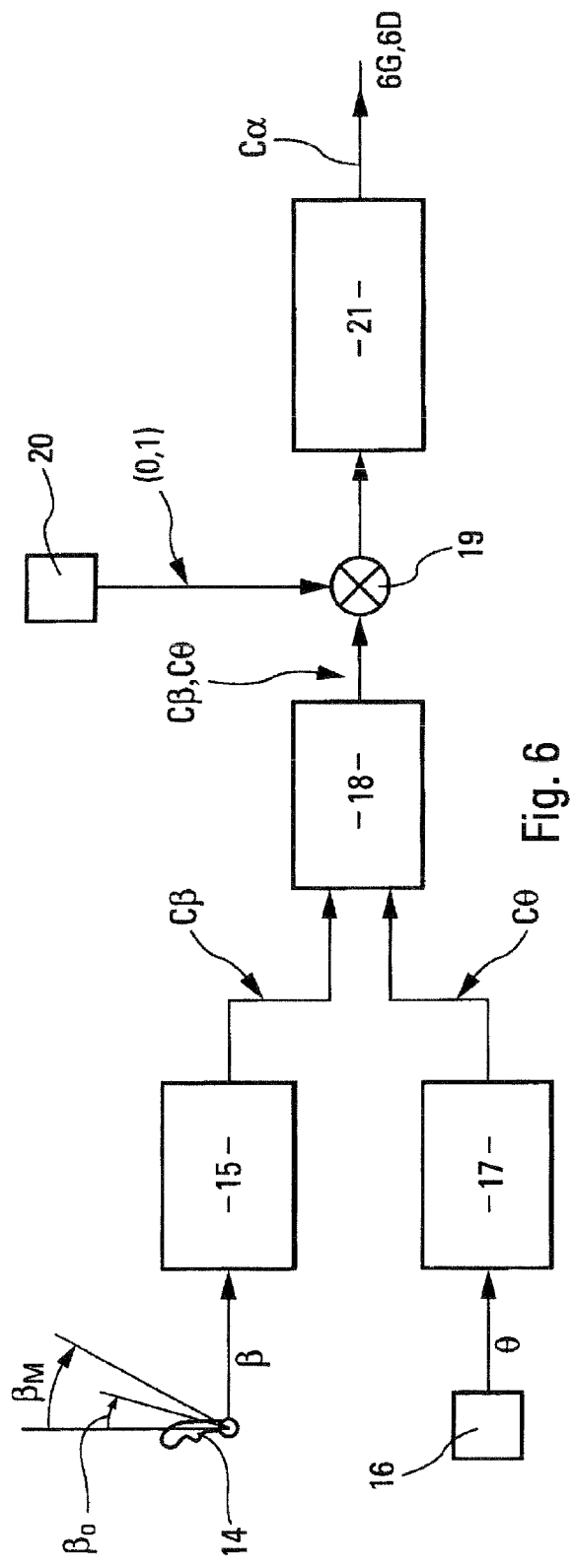
FIG. 6 is a block diagram for implementing the method in accordance with the present invention.
Figure 9:
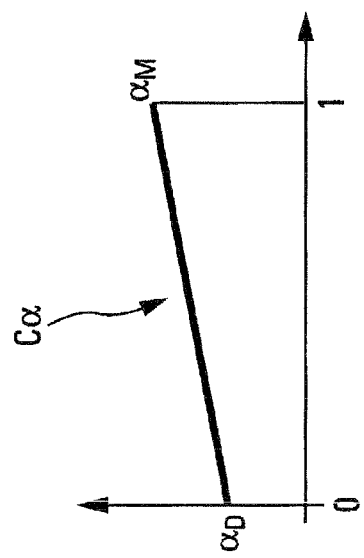
FIGS. 7, 8 and 9 show three criteria used in the block diagram of FIG. 6, respectively.

The block diagram shown by FIG. 6 is for implementing the method of the invention, while taking into account that, during a regular take-off, it is usual:

to position the piloting stick to a predetermined nose-up position which corresponds to a fraction $\beta_0$, for example equal to ⅔, of the maximum nose-up stroke $\beta_M$ of said stick; and to impose on the aircraft a maximum attitude $\theta_0$ so that a tail strike during take-off rotation is avoided (this maximum attitude $\theta_0$ corresponds, for example, to a 3-feet distance between the bottom of the aircraft tail and the take-off runway RW).

Figure 8:
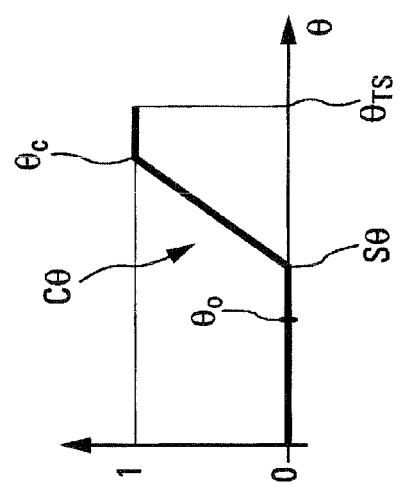
Figure 7:
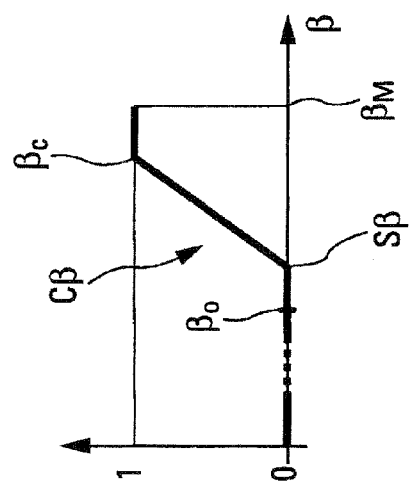

In the block diagram of FIG. 6, it is shown:

the piloting stick 14 of aircraft AC generating a signal indicative of its nose-up tilting angle $\beta$;

a logic device 15, receiving said signal $\beta$ from the stick 14 and converting it into a stick criterion C$\beta$ shown in FIG. 7: the criterion C$\beta$ is null below a threshold S$\beta$ higher than the value $\beta_0$ corresponding to said predetermined position of a regular take-off and steadily increases above said threshold S$\beta$ to reach the value of 1 to a controlled value $\beta_0$ close to, but lower than, the maximum value $\beta_M$;

an attitude sensor 16 (usual on board aircrafts) generating a signal indicative of the aircraft AC attitude $\theta$;

a logic device 17, receiving said signal $\theta$ from the attitude sensor 16 and transforming it into an attitude criterion Cθ shown in FIG. 8: the criterion Cθ is null below a threshold Sθ higher than said maximum attitude $θ_0$ and steadily increases above said threshold Sθ to reach the value of 1 to the high controlled value $θ_c$ of the attitude θ corresponding to the value $θ_c$ of the stick signal β, said value $θ_c$ being close to, but lower than, said value $θ_{TS}$ corresponding to the tail strike;

a voter 18 that receives both criteria Cβ and Cθ and which outputs the greater one;

a multiplier 19 provided at the output of said voter 18;

a detector 20 able to generate a zero signal if aircraft AC is not on the ground and a signal equal to 1 if aircraft AC is on the ground (main gear compressed), the output of the detector 20 being connected to the multiplier 19, so that the latter outputs the result of the multiplication of the signal generated by the voter 18 by 0 or 1; and a logic device 21, receiving the result of the multiplication carried out by the multiplier 19 and transforming it into a deflection criterion of ailerons Cα, said criterion being equal to said partial deflection value $α_D$ (see FIG. 4) if the output of the multiplier 19 is null and steadily increasing from the value $α_D$ to the maximum value $α_M$, if the output of the multiplier 19 steadily increases from 0 to 1.

It will be noticed that the logic illustrated by FIGS. 6 to 9 can readily be implemented in the calculators on board the aircraft AC, which calculators usually have information about deflection β of the piloting stick 14, attitude θ of aircraft AC and whether the aircraft is on the ground or not.

The invention claimed is:

1. A method for dramatically reducing the take-off run of an aircraft (AC),
   wherein the aircraft (AC) comprises
      at least one piloting stick (14),
      a main landing gear (11),
      ailerons (6G, 6D), and
      depth moving aerodynamic surfaces (7, 9G, 9D),
      wherein the method is implemented in flight control calculators of said aircraft (AC), provided with information about the tilting (β) of said piloting stick (14) and the attitude (θ) of said aircraft (AC),
      wherein the take-off run is a period during which said aircraft (AC) is running on a take-off runway (RW) by accelerating with said main landing gear (11) compressed by the mass of said aircraft and by ground effect and with said ailerons (6G, 6D) occupying a position ($α_D$) partly deflected downwards to maximize the fineness ratio of said aircraft,
      wherein a tilting threshold (Sβ) is at least equal to a take-off tilting ($β_0$) usually used during a regular take-off,
      the method comprising:
      tilting said piloting stick (14) in the nose up direction to deflect said depth aerodynamic surfaces (7, 9G, 9D) upwards to provide said aircraft with a high value attitude ($θ_c$) at which the tail of said aircraft approaches but does not strike the take-off runway (RW);
      setting a stick criterion (Cβ) the value of which is 0 below said tilting threshold (Sβ) and the value of which increases from 0 to 1 between said tilting threshold (Sβ) and a controlled tilting value ($β_c$) close to, but lower than, the maximum nose-up tilting ($β_m$) of said stick;
      setting an attitude criterion (Cθ), the value of which is 0 below said attitude threshold (Sθ) and the value of which increases from 0 to 1 between said attitude threshold (Sθ) and a controlled attitude value ($θ_c$) close to, but lower than, a tail strike attitude ($θ_{TS}$), at which the tail of said aircraft would strike the runway;
      setting, an aileron deflection criterion from the greater of the stick criterion (Cβ) and the attitude criterion (Cθ), wherein the aileron deflection criterion steadily increases from the value ($α_D$) corresponding to the partly deflected position downwards to the value ($α_M$) corresponding to the fully deflected position downwards, when said greater criterion switches from the value of 0 to the value of 1;
      after said deflection upwards and while said main landing gear (11) is still compressed, fully deflecting said ailerons (6G, 6D) downwards ($α_M$), symmetrically, from their position ($α_D$) partly deflected downwards;
      continuing acceleration of the aircraft until take-off, while maintaining the high value attitude ($θ_c$) position and while maintaining said ailerons (6G, 6D) fully deflected downwards.

2. The method according to claim 1, wherein said full symmetrical deflection downwards of said ailerons (6G, 6D) is only allowed above a tilting threshold (Sβ) of said stick (14) in the nose-up direction.

3. The method according to claim 1, wherein said full symmetrical deflection downwards of said ailerons (6G, 6D) is only allowed above a nose-up attitude threshold (Sθ).

4. The method according to claim 3, wherein said nose-up attitude threshold (S∂) is at least equal to the maximum attitude value ($θ_0$) imposed on said aircraft so that a tail strike during a regular take-off rotation is avoided.

5. The method according to claim 1, wherein, after ballasting-up of said main landing gear (11), said ailerons (6G, 6D) are brought back from the fully deflected position downwards ($α_m$) to said partly deflected position downwards ($α_D$).

6. The method according to claim 1, wherein said
   flight control calculators are provided with information about whether the aircraft is on the ground or not, the method further comprising:
      setting a ground criterion, which assumes the value of 0 when the aircraft is in flight and the value of 1 when the aircraft is on the ground; and
      multiplying the greater of two criteria that are the stick criterion (Cβ) and the attitude criterion (Cθ) by said ground criterion, before setting said aileron deflection criterion (Cα).

7. The method according to claim 1, wherein the high value attitude is such that the tail of said aircraft is a distance of about 3 feet from the take-off runway.

8. An aircraft, implementing a method for dramatically reducing the take-off run of the aircraft (AC),
   wherein the aircraft (AC) comprises
      at least one piloting stick (14),
      a main landing gear (11),
      ailerons (6G, 6D), and
      depth moving aerodynamic surfaces (7, 9G, 9D),
      wherein the method is implemented in flight control calculators of said aircraft (AC), provided with information about the tilting (β) of said piloting stick (14) and the attitude (θ) of said aircraft (AC),
      wherein the take-off run is a period during which said aircraft (AC) is running on a take-off runway (RW) by accelerating with said main landing gear (11) compressed by the mass of said aircraft and by ground effect and with said ailerons (6G, 6D) occupying a position ($α_D$) partly deflected downwards to maximize the fineness ratio of said aircraft, wherein a tilting threshold (S$\beta$) is at least equal to a take-off tilting ($\beta_0$) usually used during a regular take-off, the method comprising:

tilting said piloting stick (14) in the nose up direction to deflect said depth aerodynamic surfaces (7, 9G, 9D) upwards to provide said aircraft with a high value attitude ($\theta_c$) at which the tail of said aircraft approaches but does not strike the take-off runway (RW);

setting a stick criterion (C$\beta$), the value of which is 0 below said tilting threshold (S$\beta$) and the value of which increases from 0 to 1 between said tilting threshold (S$\beta$) and a controlled tilting value ($\beta_c$) close to, but lower than, the maximum nose-up ($\beta_m$) of said stick;

setting an attitude criterion (C$\theta$), the value of which is 0 below said attitude threshold (S$\theta$) and the value of which increases from 0 to 1 between said attitude threshold (S$\theta$) and a controlled attitude value ($\theta_c$) close to, but lower than, a tail strike attitude ($\theta_{TS}$), at which the tail of said aircraft would strike the runway;

setting, an aileron deflection criterion from the greater of the stick criterion (C$\beta$) and the attitude criterion (C$\theta$), wherein the aileron deflection criterion steadily increases from the value ($\alpha_D$) corresponding to the partly deflected position downwards to the value ($\alpha_M$) corresponding to the fully deflected position downwards, when said greater criterion switches from the value of 0 to the value of 1;

after said deflection upwards and while said main landing gear (11) is still compressed, fully deflecting said ailerons (6G, 6D) downwards ($\alpha_M$), symmetrically, from their position ($\alpha_D$) partly deflected downwards;

continuing acceleration of the aircraft until take-off, while maintaining the high value attitude ($\theta_c$) position and while maintaining said ailerons (6G, 6D) fully deflected downwards.

\* \* \* \* \*